United States Patent [19]

Prikhodko et al.

[11] Patent Number: 4,493,961

[45] Date of Patent: Jan. 15, 1985

[54] APPARATUS FOR ELECTROHYDROBLASTING TRIMMING OF CASTINGS

[75] Inventors: Valery V. Prikhodko; Boris V. Kostyrkin, both of Nikolaev, U.S.S.R.

[73] Assignee: Proektno-Konstructorskoe Bjuro Elektrogidravliki Adademii Nauk Ukrainskoi SSR, Nikolaev, U.S.S.R.

[21] Appl. No.: 367,957

[22] Filed: Apr. 13, 1982

[51] Int. Cl.³ .......................... B08B 3/10; B23P 1/06

[52] U.S. Cl. .......................... 219/69 R; 134/109

[58] Field of Search .................... 219/69 D, 69 R, 68, 219/69 M; 204/129.6, 129.7, 129.46, 129.75; 366/137; 134/104, 109, 111; 164/131, 132, 154, 404

[56] References Cited

U.S. PATENT DOCUMENTS

| | | | |
|---|---|---|---|
| 1,056,738 | 3/1913 | Catlett et al. | 134/111 |
| 1,861,428 | 5/1932 | Furnas | 134/104 |
| 2,155,854 | 4/1939 | Barnes et al. | 134/104 |
| 2,789,568 | 4/1957 | Hirst | 134/104 |
| 3,469,057 | 9/1969 | Maines | 219/69 D |
| 3,883,410 | 5/1975 | Inoue | 204/129.46 |
| 4,204,913 | 5/1980 | Sabatka | 134/109 |
| 4,303,453 | 12/1981 | Jung et al. | 134/109 |
| 4,304,288 | 12/1981 | Pluim | 164/269 |
| 4,350,174 | 9/1982 | Bolten et al. | 134/104 |
| 4,398,551 | 8/1983 | Moorehead | 134/104 |

FOREIGN PATENT DOCUMENTS

| | | | |
|---|---|---|---|
| 2511904 | 3/1982 | France | 164/132 |
| 5251209 | 1/1978 | Japan | 134/104 |
| 55-66168 | 12/1981 | Japan | 219/69 D |
| 416954 | 10/1934 | United Kingdom | 134/104 |
| 435804 | 12/1974 | U.S.S.R. | 134/104 |
| 662738 | 5/1979 | U.S.S.R. | 134/104 |

*Primary Examiner*—Roy N. Envall, Jr.

*Assistant Examiner*—Geoffrey S. Evans

*Attorney, Agent, or Firm*—Burgess, Ryan & Wayne

[57] ABSTRACT

An apparatus for electroblasting trimming of castings, in which castings being trimmed are placed in a bath containing a working fluid, the bottom part of the bath narrowing and having a device for removing sludge which comprises a hydraulic elevator installed in the bottom part of the bath and communicating with a tank for settling solid fraction from the working fluid.

11 Claims, 2 Drawing Figures

APPARATUS FOR ELECTROHYDROBLASTING TRIMMING OF CASTINGS

FIELD OF THE ART

The invention relates to the foundry, and more particularly it deals with an apparatus for electrohydroblasting trimming of castings from molding and core sands.

BACKGROUND OF THE INVENTION

Known in the art are apparatus for electrohydroblasting trimming of castings, wherein the castings being trimmed are placed in a bath containing a working fluid. The bottom part of the bath narrows for the collection of slime. The sludge is removed by means of a pump (cf. the USSR inventor's Certificate No. 415091, cl. B22 D, 1980; U.S. Pat. No. 4,198,995, C1.B08B 3/10).

Molding sand is removed during the electrohydroblasting trimming. A part of large-size lumps of the sand is thrown out from the container during the electrohydroblasting trimming, gets to the bottom part of the bath and clogs the pump so as to cause the suspension of operation and cleaning of the pump. Installation of filters at the inlet cannot give useful results as the filter is also rapidly clogged with large-size particles.

In addition, in pumping the working fluid containing a large quantity of core sand rapid wear of pump members occurs owing to the presence of abrasive particles in the core sand so that the pump members removing the sludge must be frequently replaced.

SUMMARY OF THE INVENTION

It is an object of the invention to provide an apparatus for electrohydroblasting trimming of castings in which the working fluid is recycled for re-use.

Another object of the invention is to reduce the consumption of working fluid during trimming.

Still another object of the invention is to improve the reliability of the apparatus in operation.

BRIEF DESCRIPTION OF THE INVENTION

A further object of the invention is to reduce the down time and improve productivity of the apparatus for electrohydroblasting trimming of castings.

These objects are accomplished by an apparatus for electrohydroblasting trimming of castings, wherein the castings being trimmed are placed in a bath containing a working fluid, the bottom part of the bath narrowing and having a device for removing sludge, according to the invention, the device for removing sludge comprises a hydraulic elevator which is provided in the bottom part of the bath and communicates with a tank for settling the solid fraction from the working fluid.

A conveyor for feeding the solid fraction to a 15 draining tank may be provided in the tank.

As a result the reliability of the device for removing sludge in operation is improved, and the solid fraction may be separated from the working fluid.

The tank for settling the solid fraction preferably communicates with the bath, the bottom of the draining tank is inclined and a filter is installed in the lower part thereof so as to enable recycling of working fluid for re-use and lower the percentage of the working fluid in the sludge.

A tray is preferably provided under the draining tank for collecting the working fluid.

The tank for settling the solid fraction and the draining tank are preferably operatively installed above the level of the working fluid in the bath, the tray communicating with the bath so as to simplify the design of the apparatus.

Owing to the provision of reliable removal of sludge from the bath and sepration of the sludge from the working fluid with the recycling of the latter for re-use, it is now possible to reduce inoperative time for repair and cleaning of the device for removing sludge and to reduce the consumption of working fluid.

Other objects and advantages of the invention will become apparent from the following description of a specific embodiment thereof with reference to the accompanying drawings, in which:

DETAILED DESCRIPTION OF THE INVENTION

Figure 1:
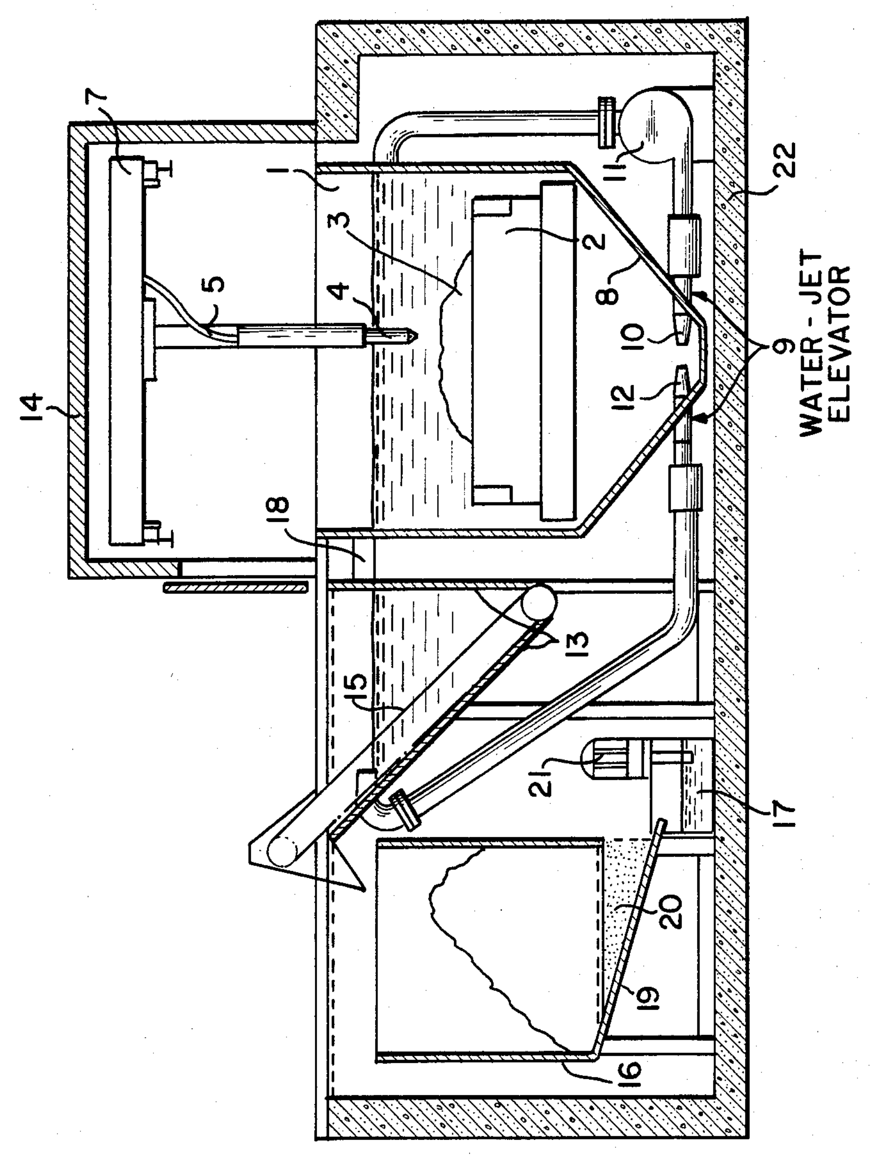
FIG. 1 is a longitudinal section of an apparatus for electrohydroblasting trimming of castings according to the invention.

An apparatus for electrohydroblasting trimming of castings comprises a bath 1 (FIG. 1) containing a working fluid having an electrical conductivity required for the electrohydroblasting trimming of castings and in which a container 2 with castings 3 is placed. A working electrode 4 is immersed in the bath 1 so as to define a spark gap with the surface of the casting 3. Current pulses are transmitted to the spark gap so as to obtain electrohydroblasting discharges in the working fluid to enable destruction of molding sands and their removal from the casting surface.

The working electrode 4 is connected by means of a flexible conductor 5 to a pulse current generator (not shown in the drawing) and is secured to a device 7 for moving the electrode.

The bottom part 8 of the bath 1 is narrowed for removing sludge.

A device for removing sludge according to the invention comprises a hydraulic elevator 9 installed in th bottom part 8 of the bath 1. Working fluid is fed to a delivery pipe 10 of the hydraulic elevator 9 by means of a pump 11. A suction pipe 12 of the hydraulic elevator 9 communicates with a tank 13 for settling the solid fraction from the working fluid.

The bath 1 and the device 7 for moving the working electrode 4 are closed by a sound insulating casing 14.

A conveyor 15 is installed in the tank 13 for feeding the solid fraction into a draining tank 16 installed over a tray 17. The tank 13 communicates with the bath 1 through an overflow channel 18.

A bottom 19 of the draining tank 16 is inclined, and a filter in the form of a rubble gate 20 is provided in the lower part of the tank 16.

Fluid is pumped by a pump 21 from the tray 17. The whole apparatus is installed on a reinforced concrete foundation 22.

Figure 2:
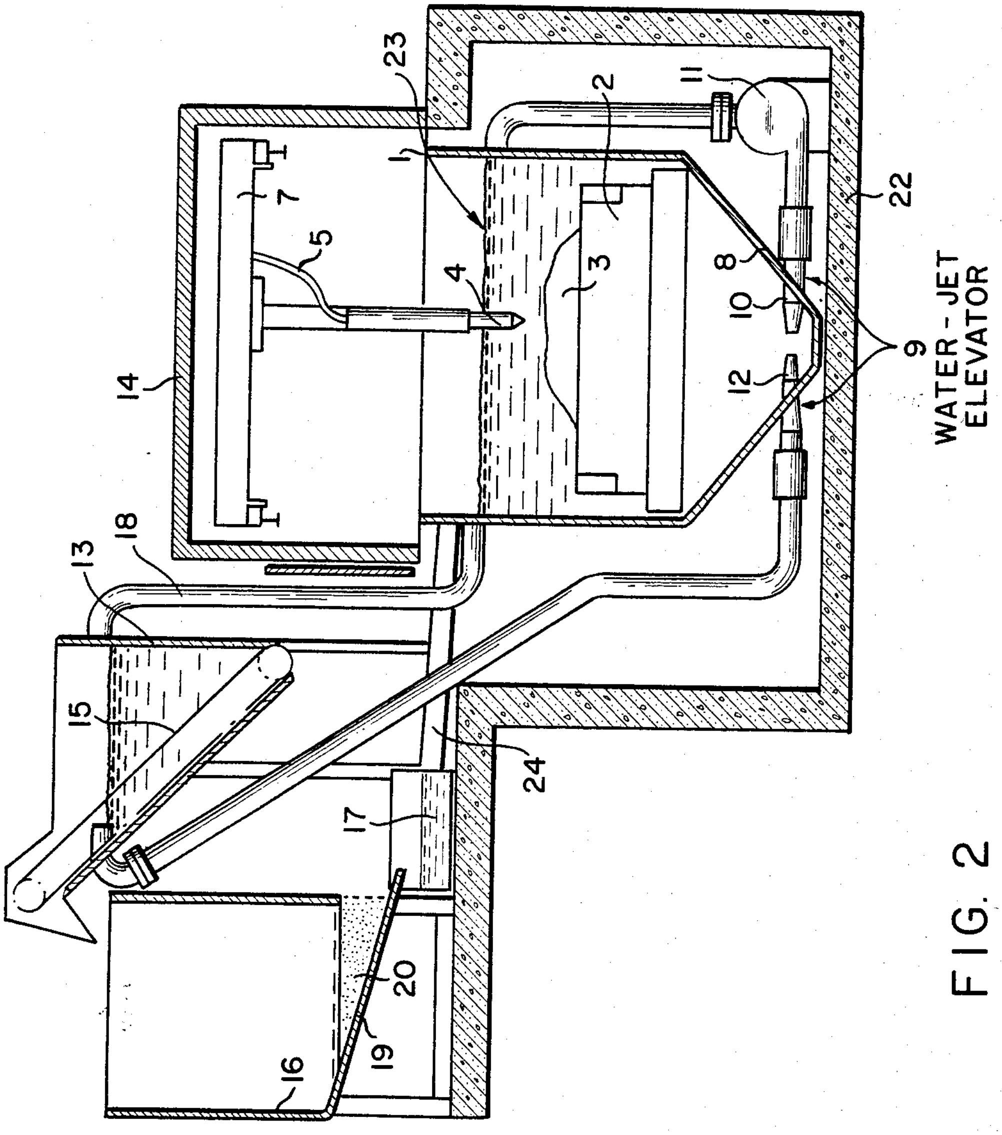
FIG. 2 is another embodiment of the apparatus according to the invention.

In an apparatus for electrohydroblasting timing of castings shown in FIG. 2 the tank 13 for settling the solid fraction and the draining tank 16 with the tray 17 are installed above a pre-set level 23 of working fluid in the bath 1, the tray 17 communicating with the bath 1 through a channel 24 for draining the working fluid out of the tray 17 into the bath 1.

The apparatus functions in the following manner.

The castings 3 are placed into the container 2 and are fed to the working zone of the bath 1. The working electrode 4 is fed to one of the castings 3 by means of the device 7 for moving the electrode, and a spark gap is formed between the electrode 4 and the castings. The pulse current generator is energized (not shown), and high-voltage current pulses are transmitted therefrom along the flexible conductor 5 to the working electrode 4. Electrohydroblasting discharges occur in the working fluid between the electrode and the casting 3 to cause a complex of phenomena enabling destruction and removal of molding and core sands from the castings 3. The broken molding and core sands (sludge) descend under gravity to the bottom part 8 of the bath 1 wherefrom they are pumped by the hydraulic elevator 9 owing to a suction provided in the suction pipe 12 by the flow of the working fluid fed by the pump 11 to the delivery pipe 10 of the hydraulic elevator 9.

In principle, a jet of the hydraulic fluid that issues from the nozzle 10 in FIGS. 1 and 2 is directed into inlet of the elevator pipe 12. The kinetic energy in the jet issuing front nozzle 10 entrains liquid from the bath and the solid particulate material and carries the particulate material, the bath liquid and the fluid in the jet up the elevator or discharge pipe. The "hydraulic elevator" is useful in the present invention since it permits the removal of solids having a high density and large particle size from the bottom of the electrohydroblasting tank without causing severe abrasion and erosion of rapidly moving mechanical parts.

The device has one additional significant advantage in the apparatus of the present invention in that the high velocity jet of the hydraulic fluid issuing from nozzle 10 pushes and forces the bath fluid along with the particulate material into and up the hydraulic elevator pipe 12. Since the jet of hydraulic fluid mixes the bath with the particulate material and forces them through the pipe, the apparatus does not rely upon the suction of a pump pulling the material through the inlet. The jet of hydraulic fluid disperses the particulate matter and prevents it from settling and clogging the inlet of the device.

The hydraulic elevator, when applied to the apparatus and process of the present invention, is a significant improvement which extends the onstream time of the device and substantially reduces the erosion and abrasion caused by the hard particulate material on rapidly moving mechanical parts.

The flow of working fluid is then fed to the tank 13 for settling the solid fraction (broken molding and core sand) from the working fluid, wherein lumps of the sand settle, and the working fluid is returned back to the bath 1 through the overflow channel 18.

The settling lumps of the sand are fed by the conveyor 15 to the draining tank 16. The residues of working fluid entrained with the lumps of sand settle under gravity in the draining tank 16 and are admitted through a filter 20 in the form of a rubble gate to the tray 17. The time of contact of the broken core sand with the working fluid in the tanks 13, 16 is minimized (1 to 3 minutes) so as to lower the rate of drop of the specific resistivity of the working fluid, thereby reducing the consumption of working fluid since the working fluid with the specific resistivity below 15 Ohm.m is to be replaced.

The working fluid collected in the tray 17 is pumped therefrom by means of the pump 21 or, in case the tanks 13 and 16 are installed above the level 23 of the working fluid in the bath 1, the working fluid flows under gravity to the bath 1 through the channel 24.

The apparatus according to the invention enables mechanization of the removal of sludge and re-use of working fluid; it also makes it possible to lower the percentage of working fluid in the sludge, substantially reduces the consumption of working fluid and improves the reliability of the system in operation.

We claim:

1. An apparatus for electrohydroblasting trimming of castings, comprising: a bath in which the castings being trimmed are placed; a working fluid filling said bath, said working fluid having an electrical conductivity required for the electrohydroblasting trimming; a bottom part of said bath which narrows; a working electrode immersed in said working fluid and defining a spark gap with the surface of the castings being trimmed; means for providing current pulses to said spark gap, whereby electrohydroblasting discharges occur in said working fluid so as to remove molding sand from the surface of the castings; means for moving said working electrode with respect to the surface of the castings being trimmed, said electrode being secured to said means; said means for moving the electrode being installed over said bath; a hydraulic elevator for removing sludge formed as a result of removal of molding sand, which is provided in said bottom part of said bath; a tank for settling the solid fraction from said working fluid, communicating with said hydraulic elevator for the transfer of the sludge from said bath to said tank.

2. An apparatus according to claim 1, comprising a conveyor provided in said tank for settling the solid fraction; a draining tank operatively installed downstream of said tank for settling the solid fraction said conveyor feeding the solid fraction into said draining tank.

3. An apparatus according to claim 1, wherein said tank for settling the solid fraction communicates with said bath.

4. An apparatus according to claim 1, comprising a filter provided in said draining tank; the bottom of said draining tank being inclined.

5. An apparatus according to claim 1, comprising a tray which is installed under said draining tank.

6. An apparatus according to claim 2, wherein said tank for settling the solid fraction communicates with said bath.

7. An apparatus according to claim 2, comprising a filter provided in said draining tank; the bottom of the draining tank being inclined.

8. An apparatus according to claim 2, comprising a tray which is installed under said draining tank.

9. An apparatus according to claim 3, comprising a filter provided in said draining tank; the bottom of said draining tank being inclined.

10. An apparatus for electrohydroblasting trimming of castings, comprising: a bath in which are placed the castings being trimmed; a working fluid filling said bath and having an electrical conductivity required for electrohydroblasting trimming; a bottom part of said bath which narrows; a working electrode immersed in said working fluid and defining with the surface of the castings being trimmed a spark gap; means for providing current pulses to said spark gap, whereby electrohydroblasting discharges occur in said working fluid to cause the removal of molding sand from the surface of the castings; a device for moving said working electrode with respect to the surface of said castings, said working electrode being secured to said device; said device for moving the electrode being installed over said bath; a hydraulic elevator for removing sludge formed as a result of the removal of molding sand provided in said bottom part of said bath; a tank for settling the solid fraction from said working fluid communicating with said hydraulic elevator for the transfer of the sludge from said bath to said tank and communicating with said bath for returning said working fluid; a conveyor provided in said tank for settling the solid fraction; a draining tank having a bottom and operatively installed downstream of said tank for settling the solid fraction; said conveyor feeding the solid fraction to said draining tank; said bottom of said draining tank being inclined; a filter provided in said draining tank; a tray installed under said draining tank.

11. An apparatus for electrohydroblasting trimming of castings, comprising: a bath in which are placed the castings being trimmed; a working fluid filling said bath and having an electrical conductivity required for electrohydroblasting trimming; a bottom part of said bath which narrows; a working electrode immersed in said working fluid and defining with the surface of the castings being trimmed a spark gap; means for providing current pulses to said spark gap, whereby electrohydroblasting discharges occur in said working fluid to cause the removal of molding sand from the surface of the castings; a device for moving said working electrode with respect to the surface of the castings being trimmed, said working electrode being secured to said device; said device for moving the working electrode being installed over said bath; a hydraulic elevator for removing sludge which is formed as a result of destruction of molding sands, provided in said bottom part of said bath; a tank for settling a solid fraction from the working fluid communicating with said hydraulic elevator for the transfer of the sludge from said bath to said tank and communicating with said tank for returning back said working fluid; a conveyor provided in said tank for settling the solid fraction; a draining tank having a bottom and operatively installed downstream of said tank for settling the solid fraction; said conveyor feeding the solid fraction to said draining tank; said bottom of said draining tank being inclined; a filter provided in said draining tank; a tray provided under said draining tank and communicating with said tank; said tank for settling the solid fraction and said draining tank with said tray being operatively installed above the level of the working fluid in said bath.

* * * * *